United States Patent [19]
Stich et al.

[11] 3,840,790
[45] Oct. 8, 1974

[54] ELECTRONICALLY COMMUTATED MOTOR

[75] Inventors: Frederick A. Stich; Glenn W. Schwantes, both of Milwaukee, Wis.

[73] Assignee: Allis-Chalmers Corporation, Milwaukee, Wis.

[22] Filed: Aug. 7, 1972

[21] Appl. No.: 278,577

[52] U.S. Cl. ................. 318/254, 318/439, 318/138
[51] Int. Cl. ......................................... H02k 29/00
[58] Field of Search ..................... 318/439, 254, 138

[56] References Cited
UNITED STATES PATENTS

| | | | |
|---|---|---|---|
| 2,719,944 | 10/1955 | Brailsford | 318/254 |
| 3,418,550 | 12/1968 | Kolatorowicz et al. | 318/254 |
| 3,495,149 | 2/1970 | Swain | 318/138 |
| 3,501,664 | 3/1970 | Veillette | 318/254 |
| 3,639,818 | 2/1972 | Wiart | 318/138 |
| 3,678,358 | 7/1972 | Kolutorowicz | 318/254 |
| 3,696,277 | 10/1972 | Liska | 318/254 |
| 3,697,840 | 10/1972 | Koch | 318/254 |
| 3,704,402 | 11/1972 | Leitgeb | 318/254 |

Primary Examiner—G. R. Simmons
Attorney, Agent, or Firm—Lee H. Kaiser

[57] ABSTRACT

A n-phase electronically commutated motor has a stator with n angularly displaced phase windings, each of which comprises a pair of power windings, and 2n drive windings each of which is inductively coupled to one of the power windings. Each power winding is connected in series with a transistor power switch across an electric power source so that the power windings of each phase generate magnetic fluxes in opposite directions and operate in push-pull. A capacitive rotor sensor coupled to the motor rotor derives n-phase square wave rotor position signals displaced 360/n degrees apart at a frequency proportional to rotor speed, and n sets of logic gates receive the rotor position signals and control the conduction interval of the power transistors. The logic gates are opened during rotor position signals which energize the power switches in a sequence that generates a rotating magnetic field within the stator. A base drive transistor is connected between the base of each transistor power switch and the associated drive winding, and current is fed back from the associated inductively linked power and drive windings through the base drive transistor to sustain conduction of the power switch.

10 Claims, 15 Drawing Figures

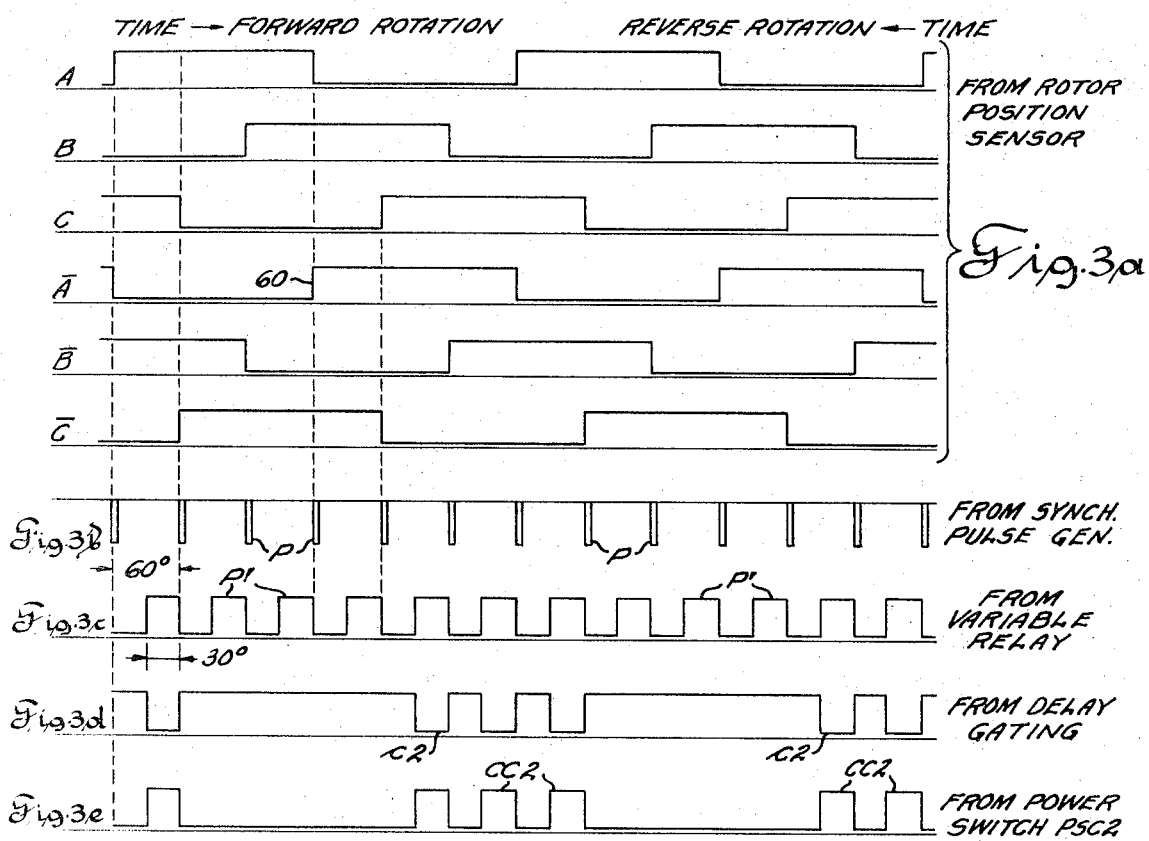
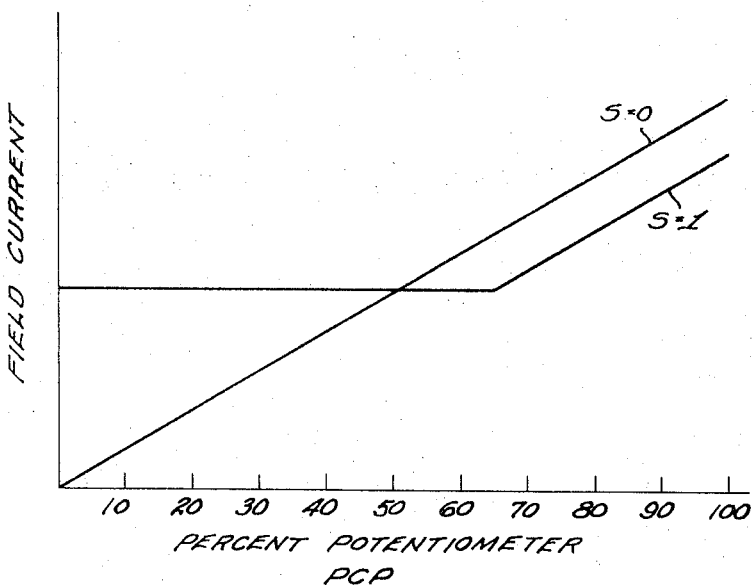

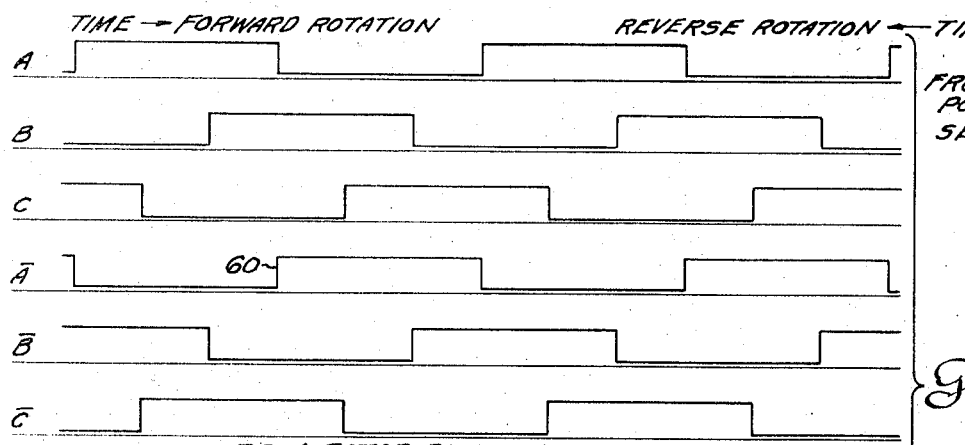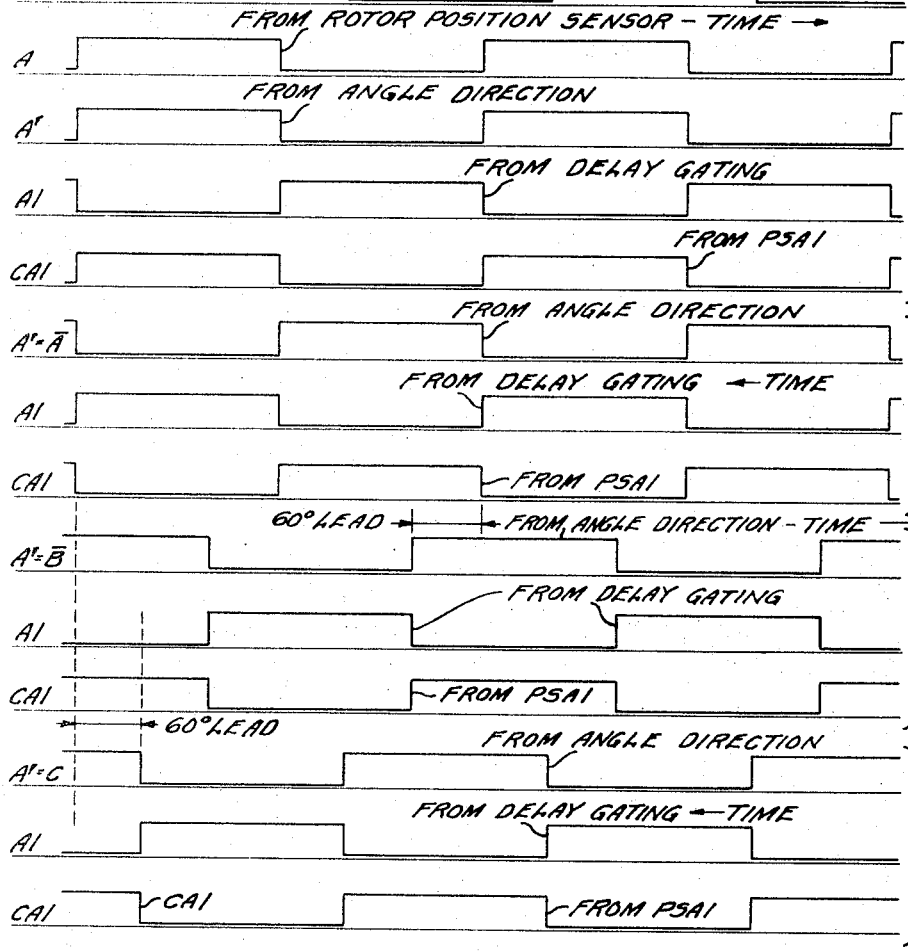

ELECTRONICALLY COMMUTATED MOTOR

This invention relates to brushless motors and more particularly to a variable speed electronically commutated motor.

BACKGROUND OF THE INVENTION

Commutation in a conventional direct current motor is essentially a mechanical switching operation in which brushes and a segmented commutator cyclically reverse current through the armature conductors in a sequence as a function of rotor position, and such commutation results in friction wear and sparking with attendant generation of radio frequency noise. In order to eliminate such defects, brushless D.C. motors have been developed provided with electronic commutation means for controlling the armature current in accordance with the rotational position of the rotor. Brushless D.C. motors are also known which employ a permanently magnetized rotor and wherein the stator windings are energized in a cyclical sequence through semiconductor power switches which are sequentially gated in accordance with the rotational position of the rotor. Variable speed synchronous motors are also known wherein a synchro coupled to the motor rotor derives phase-displaced sine wave control signals at a frequency proportional to motor speed which regulate a cycloconverter for energizing the stator windings, and the phase angle and magnitude of the control signals are varied as a function of motor speed to advance motor torque angle at higher motor speeds.

Prior art electronically commutated motors which use optical or magnetic rotor position sensors are, in general, unnecessarily expensive and complicated and have relatively low sensitivity and relatively high temperature drift. Known electronically commutated motors using magnetic rotor position sensors have problems with D.C. offsets, while those employing optical rotor position sensors have problems with dirt and vibration. Also, prior art brushless D.C. motors do not have the desirable torque and speed characteristics of conventional direct current motors, while known variable speed synchronous motors either require complicated and expensive synchros for generating phase-displaced sine wave control signals or necessitate complicated and expensive analog circuits.

OBJECTS OF THE INVENTION

It is an object of the invention to provide an electric motor having no mechanical commutator in which a plurality of stator windings are sequentially energized through transistor power switches to produce a driving torque on the motor, with facility for reversal and speed regulation.

It is a further object of the invention to provide an improved brushless motor having electronic commutation means for controlling armature current in accordance with the rotational position of the rotor and which has speed and torque characteristics comparable to those of a conventional D.C. motor while eliminating the above disadvantages of mechanical commutation. Another object of the invention is to provide an improved electronically commutated motor which has high stall torque and operates over a wide speed range with smooth control of speed. A still further object of the invention is to provide an improved electronically commutated motor which permits smooth regenerative braking and smooth reversal of the direction of motor rotation. Still another object is to provide such a electronically commutated motor in which efficiency is high and which is relatively low in cost and simple to manufacture. A further object of the invention is to provide such an improved electronically commutated motor which is particularly adapted to drive a vehicle and which, upon failure of a power switch, will not cause the vehicle to become uncontrollable, but rather will still drive the vehicle to a repair area. Still another object is to provide an improved battery-energized, electronically commutated traction motor which consumes less energy in operation so that the range of the vehicle driven thereby is increased.

Another object of the invention is to provide an improved electronically commutated motor using transistor power switches which do not require commutators, which can easily be paralleled to attain high current capacity, and which tolerate high temperatures without damage. A further object is to provide such an improved electronically commutated motor having efficient means for driving the power switches. A still further object of the invention is to provide such an improved electronically commutated motor having novel positive feedback means for sustaining conduction by the power switches that inherently current limits to turn off the power switches if current becomes excessive. A further object of the invention is to provide a electronically commutated motor having improved regenerative means for providing base drive to the power switches which reinstate conduction by a power switch after a short time interval if it should current limit and turn off.

SUMMARY OF THE INVENTION

A electronically electric motor having n angularly displaced phase stator windings is energized, in accordance with the invention, from a power source through transistor power switches which are sequentially enabled during rotor position signals displaced 360/n electrical degrees apart derived by a rotor position sensor coupled to the motor rotor to generate a rotating magnetic field within the stator. Each stator phase winding preferably comprises a pair of power windings, and the power windings in each phase are connected through the transistor power switches so that they generate magnetic fluxes in opposite direction and operate in push-pull when they are enabled by rotor position signals which are complements of each other. Base drive is provided to each power switch through a drive winding on the stator inductively coupled to the associated power winding so that base current is fed back to sustain power switch conduction, and if collector current becomes high enough to pull a power switch out of saturation, then the base current drive decreases due to transformer action and degenerative current limit turn-off of the power switch occurs. A logic gate set associated with each phase power winding comprises a plurality of logic gates which receive different time-displaced rotor position signals and have their output commoned and coupled to the associated power switch, and the logic gates are sequentially enabled during rotor portion signals which result in generation of a rotating magnetic field within the stator.

DESCRIPTION OF THE DRAWINGS

These and other objects and advantages of the invention will be more readily apparent from the following detailed description when considered in conjunction with the accompanying drawing wherein:

FIG. 3a illustrates the three-phase output square waves from the square wave generator which indicate rotor position; FIG. 3b illustrates the train of 60° spaced apart timing pulses P from the synchronous pulse generator whose frequency is a function of motor speed; FIG. 3c illustrates the train of delay pulses P' after they have been delayed 30° in the variable delay circuit;

FIG. 3d illustrates the "logic" signals c2 from delay gating circuit 22 fed over lead C2 to interface circuit IFC2 as a result of the delay pulses P' shown in FIG. 3c; and FIG. 3e illustrates the current pulses CC2 conducted by power switch PSC2 as a result of the logic signals c2 shown in FIG. 3d;

FIGS. 7a, 7b, 7c and 7d show the rotor position signals which enable power switches PSA1 and PSA2 for, respectively: (a) forward motor rotation and 0° torque angle; (b) reverse rotation and 0° torque angle, (c) forward rotation and 60° leading torque angle, and (d) reverse rotation and 60° leading torque angle;

FIG. 12 shows the field current regulator characteristics.

DETAILED DESCRIPTION

Figure 1:
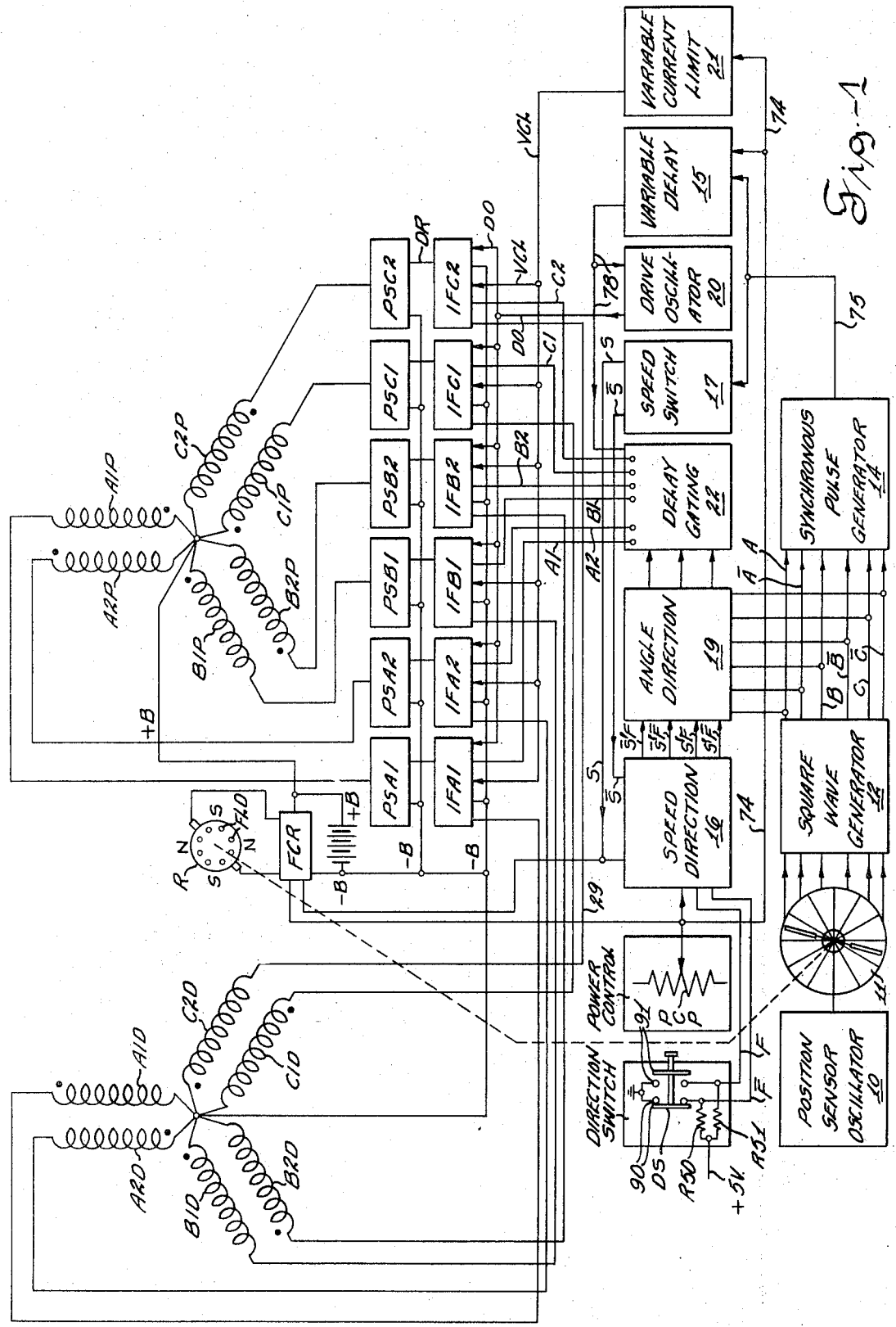
FIG. 1 is a schematic diagram in block form of the electronically commutated motor of a preferred embodiment of the invention.

Referring to the drawing, the motor of the preferred embodiment of the invention may have the frame (not shown) of a conventional synchronous motor with the stator winding schematically shown in FIG. 1 similar to that of a three-phase, wye connected, push-pull transformer. The stator has one center-tapped winding per phase, and the wye configuration is made by connecting together the center taps of the three phase windings. Stator phase A winding comprises a winding section A1P, termed a "power winding," connected in series with an oppositely polarized winding section or power winding A2P and with the center tap therebetween connected to the positive terminal of the battery and being commoned to the center tap between power windings B1P and B2P of phase B stator winding and also common to the center tap between power windings C1P and C2P of phase C stator winding. (In this system of notation, the first symbol designates the phase, the second symbol designates the polarity group, and the third symbol designates the type of winding, power or drive). The two power windings (i.e., winding sections) of each phase stator winding are of opposite polarity, e.g., winding A1p is of opposite polarity to winding A2P, winding B1P is oppositely polarized from winding B2P. Each power winding A1P, A2P, B1P, B2P, C1P, and C2P is connected to a power switch which preferably is a silicon transistor, e.g., power winding A1P is coupled to the collector of power switch PSA1, power winding A2P is coupled to the collector of power switch PSA2, etc. Only one power switch PSC2 is shown in detail in FIG. 8.

When the two power switches of a phase, such as PSA1 and PSA2 of phase A, are operated alternately to energize the oppositely polarized power windings such as A1P and A2P, the direction of magnetic flux in the motor stator is reversed, even though the direction of current from the battery through windings A1P and A2P is unchanged. Thus the power windings of each phase, such as A1P and A2P of the phase a stator winding, in conjunction with the associated power switches PSA1 and PSA2 are arranged in push-pull in a manner similar to a push-pull converter. Because of the polarities of the two power windings per phase, such as A1P and A2P, each carrying unidirectional current, an alternating flux is established in each phase of the motor stator, and the six power switches PSA1, PSA2, PSB1, PSB2, PSC1 and PSC2 conduct at the correct time to maintain the desired direction rotational velocity of the stator rotating magnetic field.

The motor rotor R is shown schematically in FIG. 1 and may be similar to a conventional synchronous motor rotor with four non-salient field poles and a field winding FLD energied with direct current from a field current regulator FCR to generate a direct current magnetic field which reacts with the rotating magnetic field generated by the stator power windings A1P-C2P to produce torque on the rotor R. FIG. 1 illustrates that the rotor field winding FLD is energized through brushes, but is will be appreciated that brushes may be eliminated if the field winding is energized from a unidirectional source including a rotating transformer (not shown) having the transformer secondary winding and the rectifiers mounted on the motor rotor in the manner disclosed in U.S. Pat. No. 3,351,396 to La Rose having the same assignee as this invention, or if the motor is of the synchronous inductor type wherein magnetic poles are generated in a windingless ferromagnetic rotor by a field winding on the stator such as disclosed in U.S. Pat. No. 3,584,276 to W. L. Ringland et al.

The motor stator also has a center-tapped "base drive" winding in each phase with the center taps connected in wye to provide six winding sections, termed "drive" windings A1D, A2D, B1D, B2D, C1D, and C2D each of which is inductively linked with the corresponding power winding of the same phase, e.g., drive winding A1D is inductively linked to power winding A1P, etc. The drive winding of each phase are connected through the power switches so that they generate magnetic fluxes in opposite directions, e.g., winding A1D is oppositely polarized from winding A2D, and each drive winding supplies base drive power to the corresponding transistor power switch and derives such power from the corresponding power winding by transformer action.

POWER SWITCH

Figure 8:
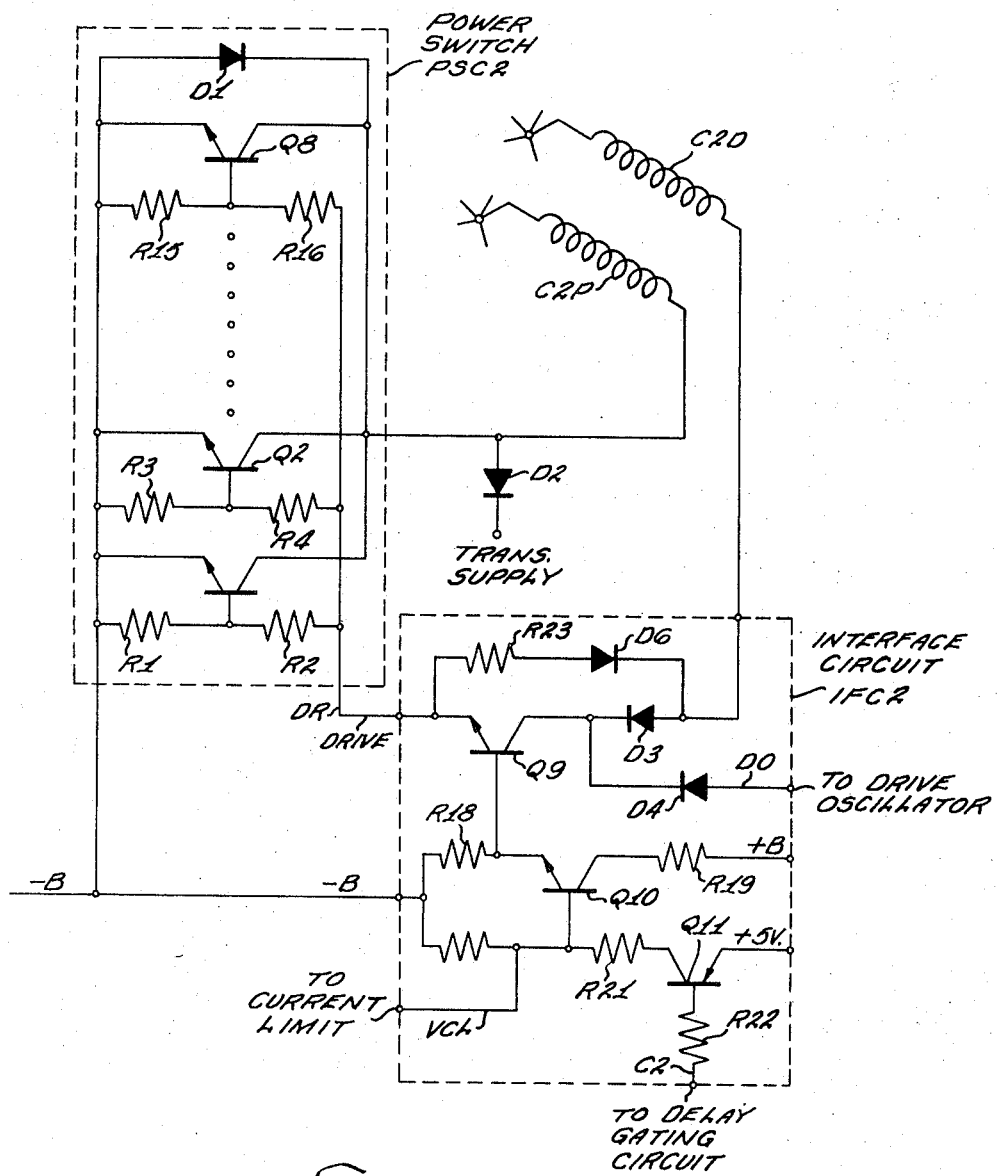
FIG. 8 is a schematic wiring diagram of power switch PSC2 and interface circuit IFC2.
Figure 9:
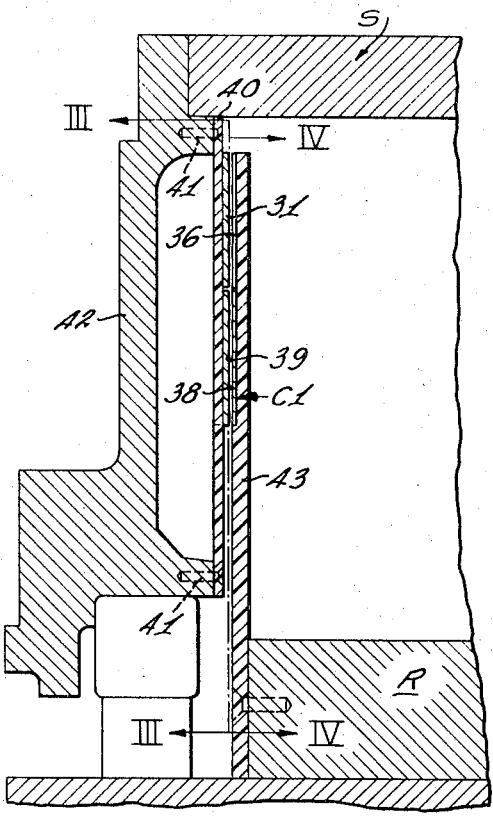
FIG. 9 is a partial cross section view through a preferred embodiment of the capacitive position sensor.
Figure 10:
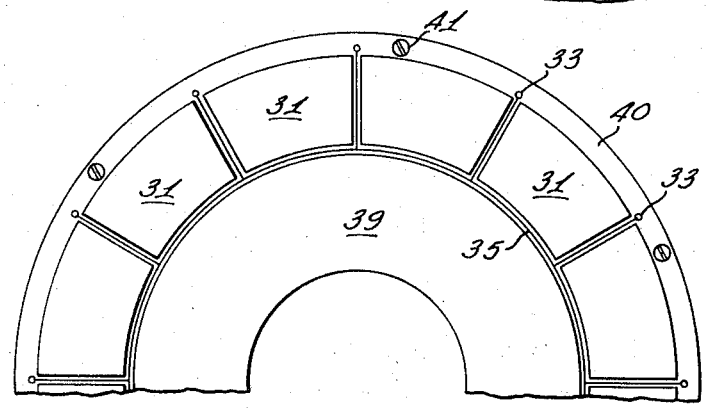
FIGS. 10 and 11 are views taken along line X—X and XI—XI, respectively, of FIG. 9.
Figure 11:
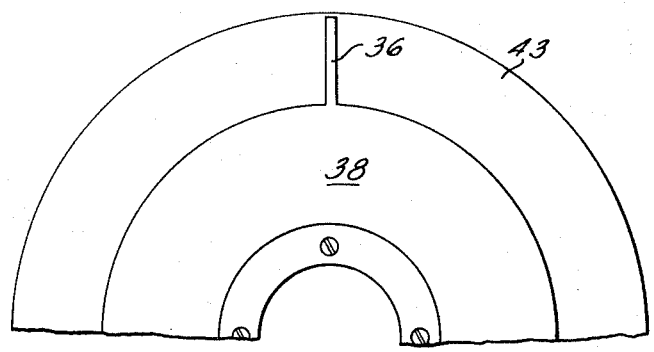

The power transistor switches PSA1, PSA2, PSB1,

PSB2, PSC1 and PSC2 for power windings A1P, A2P, B1P, B2P, C1P and C2P respectively are shown in block form in FIG. 1 and are identical to power transistor switch PSC2 for power winding C2P shown in detail in FIG. 8 comprising a plurality of paralleled power transistors Q1–Q8. The number of paralleled transistors Q1–Q8 is determined by the required current rating, and the series of dots in FIG. 8 indicates that any desired number of power trnasistors may be utilized in the transistor power switch PSC2. The collectors of transistors Q1–Q8 are commoned and connected to stator power winding C2P. The emitters of paralleled transistors Q1–Q8 are commoned and connected to the negative terminal −B of the battery. The bases of transistors Q1–Q8 are connected through similar resistors (only R1, R3 and R15 being shown) to the negative terminal −B of the battery and are also connected through similar resistors (only R2, R4 and R16 being shown) to a base lead DR to the interface circuit IFC2 for power switch PSC2. The base resistors R1–R16 insure base current sharing by the power transistors Q1–Q8. A diode D1 connected across emitter and collector of power transistors Q1–Q8 in opposite polarity thereto functions as a free-wheeling diode and regenerative path during the time the motor is acting as a generator to conduct currents flowing in the direction oppposite to the current supplied by power switch PSC2 to stator winding C2P, such as may be generated during braking of the motor. A diode D2 coupled to a TRANS SUPP lead clamps the collectors of the power transistors Q1–Q8 to a common transient suppressor circuit (not shown) which is shared by all six power switches PSA-1–PSA2.

INTERFACE CIRCUIT

The interface circuits IFA1, IFA2, IFB1, IFB2, IFC1 and IFC2 which drive the power switches PSA1, PSA2, PSB1, PSB2, PSC1 and PSC 2, respectively, are shown in block form in FIG. 1 and are similar to interface circuit IFC2 (see FIG. 8) which drives power switch PSC2. The principal function of the interface circuits IFA1-IFC2 is to step up the power level efficiently between the "logic" output from delay gating circuit 22 and the bases of the power switches PSA1–PSA2, and the interface circuits IFA1–IFC2 also protect the power switches by interrupting the "logic" signal from delay gating circuit 22 when abnormal voltages are sensed across the power switches. The base drive lead DR from power switch PSC2 is coupled to the emitter of a base drive transistors Q9 having its collector coupled through a diode D3 to drive winding C2D (which is inductively coupled to power winding C2P). The base of transistor Q9 is connected through a resistor R18 to the negative terminal −B of the battery and also to the emitter of a transistor Q10 having its collector coupled through a resistor R19 to the positive battery terminal. The collector of transistor Q9 is also coupled through a diode D4 and over a lead D0 to a drive oscillator shown in block form in FIG. 1. The base of transistor Q10 is coupled to a VCL lead from a variable current limit circuit 21 shown in block form in FIG. 1 and is also coupled through a resistor R21 to the collector of a transistor Q11. The emitter of transistor Q11 is connected to a positive five volt direct direct voltage regulator source +5V, and the base of PNP transistor Q11 is connected through a resistor R22 to a lead C2 from delay gating circuit 22. Interface circuit IFC2 is arranged so that a logical 0 voltage signal over lead C2 from the delay gating circuit 22 will result in turning on transistors Q11, Q10 and Q9 with the result of turning power switch PSC2 on (and on that a logic 1 signal on lead C2 will result in turning power switch PSC2 off).

When a power switch such as PSC2 is conducting, base current is fed back from the associated inductively linked power and drive windings C2P and C2D to sustain conduction of the power switch PSC2, and the magnitude of such feedback base drive current is a function of the drive winding voltage, the base-emitter voltage of the transistor power switch, and other voltage drops in the circuit. If the collector current of a power transistor switch becomes high enough to pull the power transistor switch out of saturation, then the base current drive to the power transistor switch will decrease and degenerative turn-off of the power transistor switch will occur. In other words, the increase of collector current to the power transistor switch pulls it into the active region and consequently increases its collector-to-emitter voltage, thereby decreasing the input to the power winding and also decreasing the output voltage from the corresponding drive winding and the base current drive to the power transistor. Such degenerative current limiting increases until the base drive transistor Q9 for the transistor power switch turns off and prevents the power transistor switch from assuming a stable operating point in the active region where it would eventually be destroyed because of the generation of excessive heat.

In an alternative embodiment the base drive is derived from a tap on the power winding rather than from a separate drive winding.

Each phase A, B and C of the motor has two identical circuits, one for each power switch, and the conducting periods of the two power switches per phase (e.g., PSC1 nd PSC2 for phase C) are displaced 180° so that a square wave is produced across the corresponding motor stator power windings such as C1P–C2P for full conduction. The other two phases A and B produce similar square waves with 120° displacement between phases for the three-phase output.

Logic 0 voltage and logic 1 voltage square wave signals over leds A1, A2, B1, B2, C1, and C2 from delay gating circuit 22 to interface circuits IFA1, IFA2, IFB1, IFB2, IFC1 and IFC2 respectively control th allowable "window" during which the power switches PSA1, PSA2, PSB1, PSB2, PSC1 and PSC2 may conduct. the initiation (and reinstatement) of power switch conduction is dependent upon pulses generated by drive oscillator 20. Drive oscillator 20 is triggered by a pulse over lead 78 from variable delay circuit 15 so that initiation of conduction by the power switches PSA1–PSC2 will coincide with the leading edges of the "logic" wave forms over leads A1, A2, B1, B2, C1 and C2 from delay gating circuit 22. Drive oscillator 20 generates a train of periodic pulses to reinstate conduction by the power switches after turn-off by current limiting.

The forward bias for power switch PSC2 is generated by drive winding C2D and is coupled through diode D3 of interface circuit IFC2 and the collector-emitter circuit of transistor Q9 to the base of power switch PSC2, while the reverse bias for the power switch PSC2 is also generated across drive winding C2D and is coupled to the base of power switch PSC2 through diode D6 in series with a resistance R23. The initial pulse from drive oscillator 20 over lead DO is coupled through diode D4 and the collector-emitter circuit of base drive transistor Q9 of interface circuit IFC2 to the base drive lead DR and the bases of power transistors Q1–Q8 of power switch PSC2 to turn them on. As explained above, the initial pulse from drive oscillator 20 is coincident with a "logic∞ signal from delay gating circuit 22, and the negative-going logic 0 square wave pulse over lead C2 from delay gating circuit 22 is coupled to the base of PNP transistor Q11 to turn it on. The change of voltage on the collector of transistor Q11 turns on transistor Q10 and base drive transistor Q9. Transistors Q11 and Q10 raise the power level of the square wave negative-going "logic" pulses from delay gating circuit 22 and apply them to the base of base drive transistor Q9. Regeneration occurs through inductively coupled power and drive windings C2P and C2D, diode D3 and the collector-emitter circuit of base drive transistor Q9 to maintain power transistors Q1–Q8 in saturation, and power switch PSC2 remains conducting after the trigger pulse from drive oscillator 20 disappears. The power switch PSC2 will remain conducting until the coupled positive feedback can no longer support switch PSC2 in saturation. The train of periodic pulses (not shown) from drive oscillator 20 will continue for the duration of the square wave "logic" pulses c2 (see FIG. 3d) over lead C2 from delay gating circuit 22, and if power switch PSC2 should current limit and turn off during the conduction interval, conduction will be resumed at the next pulse from drive oscillator 20 which is coupled through diode D4 and transistor Q9 to the base of power transistors Q1–Q8.

Once the logic 0 square wave c2 over lead C2 from delay gating network 22 disappears and logic 1 reappears on lead C2 and the pulses from drive oscillator 20 cease, the regenerative feedback through windings C2p and C2D can no longer support the power switch PSC2 in saturation because transistor Q9 is not conducting. The collector-to-emitter voltage of transistors Q1–Q8 of power switch PSC2 consequently increase and thereby decrease the voltage input to power winding C2P. Resistor R23 in series with diode D6 of interface circuit IFC2 provides a path for turn-off current to power switch PSC2 in shunt to transistor Q9, and when power switch PSC2 turns off, the polarity of drive winding C2D reverses and provides reverse bias through diode D6 and resistance R23 to the bases of the power transistors Q1–Q8 of power switch PSC2.

GENERAL THEORY OF SPEED AND DIRECTION CONTROL

The two power switches in each phase, such as power switches PSA1 and PSA2 of phase A, conduct 180° apart to provide unidirectional current to the two oppositely polarized power windings A1P and A2P respectively of phase A to thus establish an alternating flux in each phase of the motor. Capacitive position sensor 11 determines the instantaneous motor rotor position and provides a three-phase square wave output A, $\overline{A}$, B, $\overline{B}$, C and $\overline{C}$ shown in FIG. 3a at a frequency proportional to motor speed and which is indicative of rotor position and thus of the position of the rotor field with respect to the stator phase windings. The three-phase position sensor output establishes the correct stator field sequence with respect to the rotor so that the six power switches PSA1–PSA2 conduct at the right time and in the right sequence to maintain the desired direction and rotational velocity of the stator rotating field which will keep the rotor field locked therewith. Control of the motor is accomplished by delaying the turning on of the power switches PSA1–PSA2 so that they are on for less than their full conduction period.

If the three-phase square wave output A, $\overline{A}$, B, $\overline{B}$, C and $\overline{C}$ of position sensor 11 (shown in FIG. 3a) which is synchronized to the rotor position, were applied without delay and directly over leads A1, A2, B1, B2, C1 and C2 from delay circuit 22 to interface circuits IFA1, IFA2, IFB1, IFB2, IFC1 and IFC2 respectively, the motor rotor R would rotate in the forward direction at full conduction of power switches PSA1–PSC2 and with the conduction window of the power switches PSA1–PSC2 in phase with the counter e.m.f. generated in the stator power windings by the magnetic flux of the resultant ampere turns (i.e., the resultant of the rotor field winding ampere turns and the armature reaction ampere turns). Motor speed and torque are selectively controlled by varying the duty cycle of the power switches PSA1–PSC2, i.e., the portion of the conduction window during which the power switches conduct. As the duty cycle of the power switches is increased, the average current carried by the power windings is increased and consequently motor torque and rotor speed are likewise increased.

The rotor position sensor output square waves A, $\overline{A}$, B, $\overline{B}$, C and $\overline{C}$ shown in FIG. 3a are inputs to the angle-direction circuit 19 and determine the allowable window during which the power switches PSA1–PSC2 may conduct. The point of the beginning of conduction within the conduction window by the power switches PSA1–PSA2 is determined by the setting of a power control potentiometer PCP which is an input over lead 74 to variable delay circuit 15. Synchronous pulse generator 14 derives a train of timing pulses P shown in FIG. 36 at a frequency proportional to motor speed, and variable delay circuit 15 delays the pulses through a phase angle proportional to the setting of power control potentionmeter PCP to derive delay pulses P' shown in FIG. 3c which initiate conduction by power switch PSC2. The train of drive pulses over lead DO are coupled through diode D4 and transistor Q9 of interface circuit IFC2 to the bases of power transistors Q1–Q8 of power switch PSC2.

Each delay pulse P' (shown in FIG. 3c) from variable delay circuit 15 (and thus the train of drive pulses from drive oscillator 20) is continuous until the next synchronizing pulse P from pulse generator 14 is applied to variable delay circuit 15. Thus the power control potentiometer PCP sets the delay which can vary the conduction of the power switches PSA–PSC2 from full-on to full-off.

The synchronous pule generator 14 produces a timing pulse P (show in FIG. 3b) at every square wave edge of the three-phase square wave output of rotor position sensor 11. For each of these timing pulses P, the delay circuit 14 regulated by the power control potentiometer PCP begins a delay period. There are three delay periods for each half cycle (180° electrical) of the rotor position square wave because a timing pulse P is generated at each square wave edge of the three-phase square wave. The control range of this delay period is from zero to one-third of a half cycle, i.e., 60° electrical, and such delay period controls the opening of gates NAND47 – NAND52 (FIG. 6) in the delay gating circuit 22 so that the output of delay gating circuit 22 over lead C2 to interface circuit IFC 2 is three square wave segments c2 per half cycle (see FIG. 3d) each of which can be modulated from 0° to 60° of the half cycle. Assuming 30° delay, the resulting three current pulses CC2 from power switch PSC2 per half cycle are shown in FIG. 3e.

In a conventional synchronous motor the torque angle between the voltage applied to the stator windings and the counter e.m.f. generated by the flux of the resultant ampere turns varies from zero degrees at stall to almost 90° at a higher motor speed. The phase relation (torque angle) of the conduction by the power switches PSA1–PSC2 with respect to the counter e.m.f. generated in the stator power windings A1P–C2P (by the ampere turns which produce the air-gap flux) determines whether the motor is operating as a generator or a motor and also determines at what power level the motor is operating.

At low motor speed and small displacement (torque) angles between counter e.m.f. and power switch conduction, such as occur at a stall condition, the stator winding looks like substantially pure resistance to the flow frequency square waves produced by the power switches, while at higher speeds the synchronous reactance increases and the stator winding appears more like pure inductance to the battery. Consequently, it is desirable that the torque angle (i.e., the phase angle between the initiation of power switch conduction window and the counter e.m.f. generated in the stator windings by the resultant ampere turns) be small at low speeds so that stator field will be in step with the rotor and also that the torque angle be leading at higher motor speeds (with consequent higher synchronous reactance and lagging stator currents) so that the rotor field stays in synchronism with the rotating stator field.

The aforementioned U.S. Pat. No. 3,584,276 to W. L. Ringland et al. discloses a variable speed synchronous motor drive system in which the displacement angle of the terminal voltage applied to the stator winding relative to the magnetic poles generated in the rotor is continuously varied as a function of motor speed to maintain the output power of the motor constant over the speed range.

In a preferred embodiment, the torque angle is limited to two discrete values, namely 0° and 60°. Such variation in phase angle at which power switch conduction is initiated can be either for forward or reverse rotation of the motor and is in addition to the variable delay in initiation of power switch conduction as a function of the setting of power potentiometer PCP provided by variable delay circuit 15. A torque angle of 0° is used only at very low speeds and is necessary to maintain stall torque. A 60° leading torque angle is a slight compromise since it is used over a wide speed range in which torque angles of other than 60° would yield greater horsepower output from the motor, but it is a desirable compromise since the power output with 60° torque angle at maximum motor speed is approximately 85 percent of that obtained with the optimum 90° torque angle.

The speed direction circuit 16 provides signals to angle-direction circuit 19 which determine the direction of rotation of the motor (as manually selected by the direction switch DS) and also determine the proper torque angle of 0° or 60° as a function of motor speed.

The phase angle selection information is derived from the speed switch 17 which determines whether the motor is turning faster or slower than a predetermined initial speed at which the motor power output for a torque angle of 60° is equal to that for a 0° torque angle. This equalization is necessary for a smooth transition upon changing the torque angle. The preferred embodiment is for a wound rotor synchronous motor, but the invention is also applicable to a variable speed brushless synchronous motor wherein magnetic poles are induced in a ferromagnetic rotor carrying no windings by a field winding on the motor stator.

CAPACITIVE POSITION SENSOR

The capacitive rotor position sensor 11 is disclosed in the copending application of Frederick A. Stich, Ser. No. 253,418, filed May 15, 1972, and now U.S. Pat. No. 3,760,392 entitled Capacitive Position Sensor and having the same assignee as this invention, and establishes the correct sequence of enabling of the power switches PSA1–PSC2 with respect to the motor rotor. Another way of stating this function if that capactive rotor position sensor 11 establishes the correct stator field sequence with respect to the rotor field. Capacitive rotor position sensor 11, in combination with square wave generator 12, derives a three-phase train of square waves A, $\overline{A}$, B, $\overline{B}$, C, and $\overline{C}$ at a frequency proportional to rotor angular position.

Capacitive position sensor 11 may have 2pn equals twelve stationary metallic capacitor plates, or electrodes 31 (see FIGS. 1 2, 10 and 11) disposed side-by-side and forming an annular disk (where n is the number of phases and p is the number of rotor pole pairs) mounted on the motor stator. A rotatable capacitor plate shown in FIGS. 1 and 2 as comprising two electrically commoned, elongated and narrow metallic electrodes 36 aligned along a diameter of the circular disk 15 is operatively connected to the motor rotor R for movement therewith and is mounted for rotation adjacent the stationary capacitor plates 31.

Figure 2:
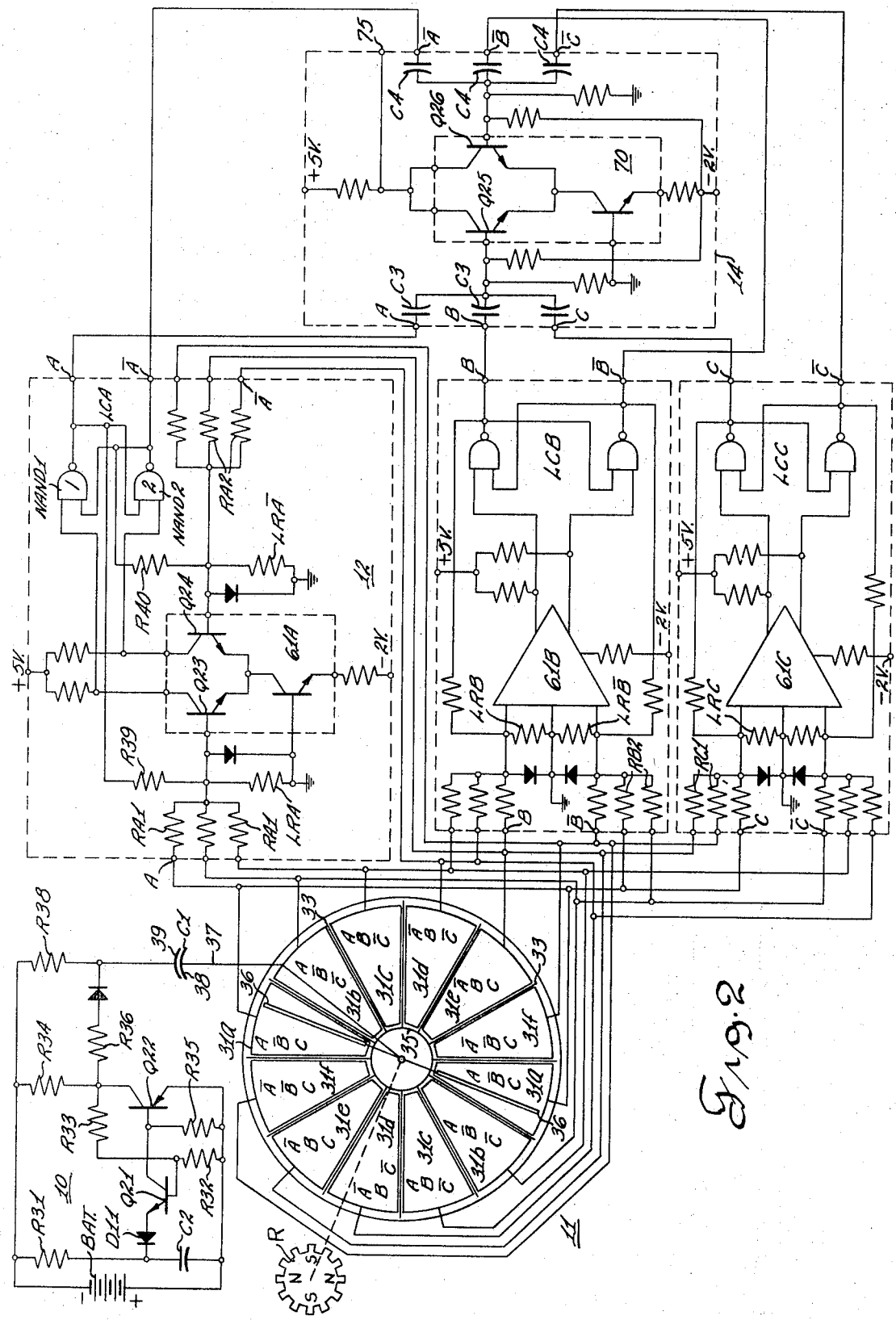
FIG. 2 is a schematic wiring diagram of the rotor position sensor, the square wave generator, and the synchronous pulse generator of FIG. 1.

The rotatable position sensor electrodes 36 are schematically shown in FIG. 2 as electrically connected to each other and by a conductor 37 to a movable electrode 38 of a coupling capacitor C1 having a stationary electrode 39 coupled to the output of a position sensor relaxation oscillator 10 which is capable of producing fast time-rise pulses. As disclosed in the aforementioned application Ser. No. 253,418 and shown in FIGS. 10 and 11, the stationary metallic position sensor electrodes 31 may be copper plates in the shape of a sector of a ring affixed by suitable means to a stationary annular stator board 40 mounted by fastening means 41 to the end bell 42 of the motor stator. The stationary electrode of coupling capacitor C1 may be a thin annular copper ring 39 affixed to stationary stator board 40 radially inward from electrodes 31. The movable electrode of coupling capacitor C1 may be a thin annular copper ring 39 affixed to stationary stator board 40 radially inward from electrodes 31. The movable electrode of coupling capacitor C1 may be a thin annular copper member 38 affixed to a rotating annular rotor board 43 fastened to the motor rotor R. Movable electrode 38 of the coupling capacitor C1 may have thin diametrically opposed fingers 36 integral therewith extending radially outward which constitute the rotatable plates 36 of the capacitive position sensor 11.

The high frequency pulses generated by relaxation oscillator 10 are coupled through rotatable capacitor electrodes 36 to the adjacent stationary plates 31 and the load connected thereto. Oscillator 10 provides "read-out" pulses to the rotatable capacitor plates 36, and these read-out pulses are distributed to the fixed capacitor plates 31. The high frequency components of the read-out pulses readily couple through adjacent movable and fixed plates 36 and 31 into the load connected to the fixed plates 31. Inasmuch as the preferred embodiment has a four-pole rotor, diametrically opposite plates 31 are displaced 360 electrical degrees and are electrically connected together. The output from the fixed plates 31 of capacitive rotor position sensor 11 are converted by square wave generator 12 into the set of three-phase square waves A, $\overline{A}$, B, $\overline{B}$, C and $\overline{C}$ shown in FIG. 3a which are at a frequency proportional to motor speed and are indicative of the position of the rotor field relative to the stator phase windings.

SQUARE WAVE GENERATOR

Square wave generator 12 includes three identical differential amplfiers 61A, 61B, and 61C (see FIG. 2) which are associated with the phases A, B and C respectively and produce the output for said phase. Square wave gnerator 12 converts the read-out pulses received on the rotor position sensor stationary plates 31a, 31b, 31c 31d, 31e and 31f into the set of three-phase square waves A, B and C and their complements $\overline{A}$, $\overline{B}$ and $\overline{C}$ shown in FIG. 3a having a frequency which is a function of the rotational velocity of the motor rotor.

Square wave generator 12 also includes three NAND gate latch circuits LCA, LCB and LCC each of which is associated with one of the phases and the differential amplifier for that phase. For example, differential amplifier 61A and latch circuit LCA are associated with phase A and together generate the square wave pulse A for phase A shown in FIG. 3a and its negation $\overline{A}$ (which is the inverse of A).

Differential mplifier 61A provides a low voltage or logic 0 output on the collector of that transistor Q23 or Q24 having its base coupled to the three pairs of position sensor stationary plates 31a, 31b, 31c or 31d, 31e, 31f having the greatest coupling to the rotatable electrodes 36, thereby giving an indication of the position of the motor rotor R. For example, if rotatable plates 36 are in a position where the sum of the read-out pulses received on the pairs of plates 31a, 31b, and 31c, designated A, is greater than the sum of the pulses received on pairs of stationary plates 31d, 31e, and 31f, designated A, transistor Q23 will be turned on and the voltage on its collector will be low and transistor Q24 will be turned off and its collector potential will be relatively high.

Differential amplifiers 61A, 61B, and 61C enhance the "one-to-zero" ratio of the inputs from capacitive position sensor 11 and control NAND gate latch circuits LCA, LCB, and LCC, respectively, which convert the enhanced pulses into the square waves A, $\overline{A}$, B, $\overline{B}$, C and $\overline{C}$.

SYNCHRONOUS PULSE GENERATOR

Synchronous pulse generator 14 receives the three-phase rotor position square waves A, B and C and their complements $\overline{A}$, $\overline{B}$ and $\overline{C}$ from square wave generator 12 and generates a timing pulse P shown in FIG. 3b at every square wave edge of the output from square wave generator 12. Synchronous pulse generator 14 thus forms a pulse train wherein each timing pulse P corresponds to a change of state in position sensor 11. Inasmuch as there are six edges per cycle of the three-phase square waves A, $\overline{A}$, B, $\overline{B}$, C and $\overline{C}$, six timing pulses P are derived by synchronous pulse generator 14 at a frequency proportional to motor speed for each cycle of the three-phase square wave output from square wave generator 12.

VARIABLE DELAY CIRCUIT

If the three phase rotor position output A, B, C, $\overline{A}$, $\overline{B}$, $\overline{C}$ of square wave generator 12 directly controlled the power switches PSA1–PSC2, the motor would rotate in the forward direction at full conduction and with the conduction window of the power switches in phase with the voltages generated by the rotor position sensor 11. Control of motor speed and torque is accomplished by "phasing back," or delaying the power switches from their full conduction. Stated in another way, speed and torque of the motor are selectively controlled by varying the duty cycle of the power switches PSA1–PSC2, i.e., the portion of the conduction window during which the power switches conduct. It will be appreciated that as the duty cycle of the power switches is increased, the average current carried by the stator windings A1P, A2P, B1P, B2P, C1P, and C2P, the torque on the rotor, and the speed of the rotor R are correspondingly increased.

The initiation (and reinstatement) of conduction by power switches PSA1–PSC2 is determined by pulses from drive oscillator 20. Timing pulses P (see FIG. 3b) from synchronous pulse generator 14 appearing in conductor 75 are delayed in a variable delay circuit 15 through a phase angle which is a function of the setting of power control potentiometer PCP to form the train of delay pulses P' shown in FIG. 3c which trigger drive oscillator 20 and enable gates NAND47 – NAND52 of the delay gating circuit 22 (see FIG. 6).

In the preferred embodiment the timing pulse P from synchronous pulse generator 14 shown in FIG. 3b are 60° apart, the variable delay circuit 15 generates three delay pulses P' per half cycle which are illustrated in FIG. 3c as having been delayed 30° relative to the timing pulses P from synchronous pulse generator 14, and the power switch PSC2 conducts three current pulses CC2 of 30° duration in each half cycle as illustrated in FIG. 3e. Inasmuch as there are three current pulses CC2 per half cycle, if each delay pulse P' is delayed by 0° to 60°, the net duty cycle of the power switches PSA-1–PSC2 will vary from 0° to 180°.

Figure 4:
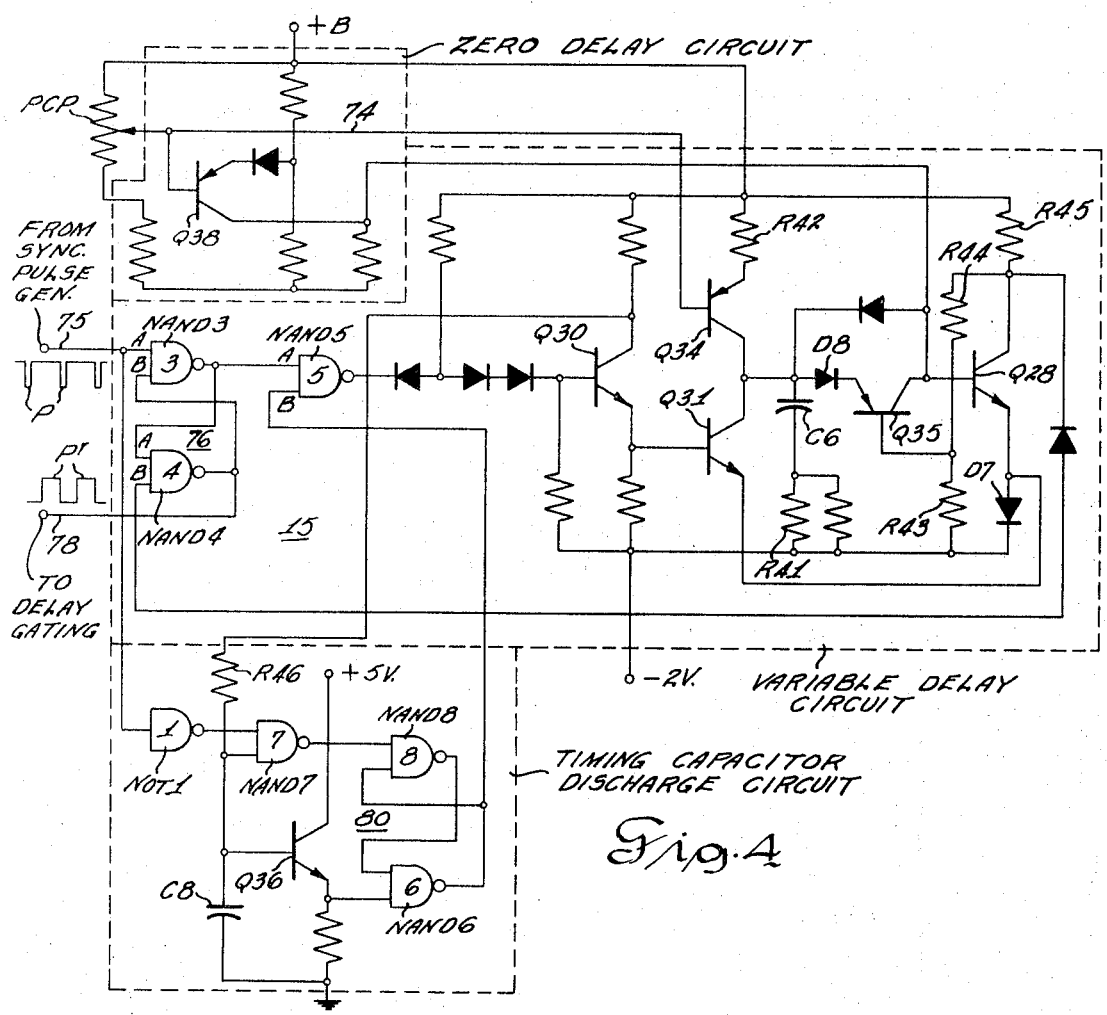
FIG. 4 is a schematic wiring diagram of the variable delay circuit.

Variable delay circuit 15 is shown in FIG. 4 and includes an input latch circuit 76 comprising NAND gates NAND3 and NAND4. Input latch circuit 76 is "set" to form the trailing edge of a delay pulse P' (shown in FIG. 3c) each time a negative-going timing pulse P from synchronous pulse generator 14 on lead 75 is applied to the A input of gate NAND3. Input latch circuit 76 is "reset" after a time delay to form the leading edge of a positive-going delay pulse P' (shown in FIG. 3c) each time a transistor Q28 conducts and changes it collector voltage from high to low to provide logic 0 to the B input to gate NAND4. The delay pulses P' generated at the output of gate NAND4 appear on output lead 78 which is connected to drive oscillator 20 and to delay gating circuit 22.

Variable delay circuit 15 is disclosed in detail in the copending application of Allois F. Geiershach and Frederick A. Stick, Ser. No. 266,286, filed June 26, 1972, entitled Control For Commutatorless Motor and having the same assignee as this invention.

Inasmuch as synchronous pulse generator 14 derives a timing pulse P at each edge of the three-phase square wave output from square wave generator 12, three delay pulses P' will be provided by the variable delay circuit 15 during each 180° conduction window, and FIG. 3e illustrates current pulses CC2 conducted by power switch PSC2 resulting from 30° phase shift of the delay pulses P' from variable delay circuit 15.

The torque angle, or displacement angle, between the voltage applied to the stator winding and the counter e.m.f. generated by the air gap flux should ideally be varied from 0° at stall to 90° at a higher speed, but in the preferred embodiment the torque angle is limited to two discrete values, namely 0° and 60° by varying the phase angle between the initiation of the power switch conduction window and the rotor position as a function of motor speed. Stated another way, different angularly displaced rotor position signals selectively control the conduction windows of the power switches in order to change torque angle as a function of motor speed. This is in addition to the variation of the point of initiation of conduction within the conduction window for the purpose of regulating motor speed and torque.

The speed-direction circuit 16 provides output signals on leads $\overline{S}'F$, $\overline{S}'\overline{F}$, and $S'\overline{F}$ which determine the direction of rotation of the motor, as manually selected by the direction switch DS, and also determine the proper torque angle of 0° or 60° as a function of motor speed. The torque angle information is derived from the speed switch 17 which determines whether the motor is turning faster or slower than a predetermined initial speed at which the motor power output for a torque angle of 60° is equal to that for a ° torque angle.

SPEED SWITCH

Figure 5:
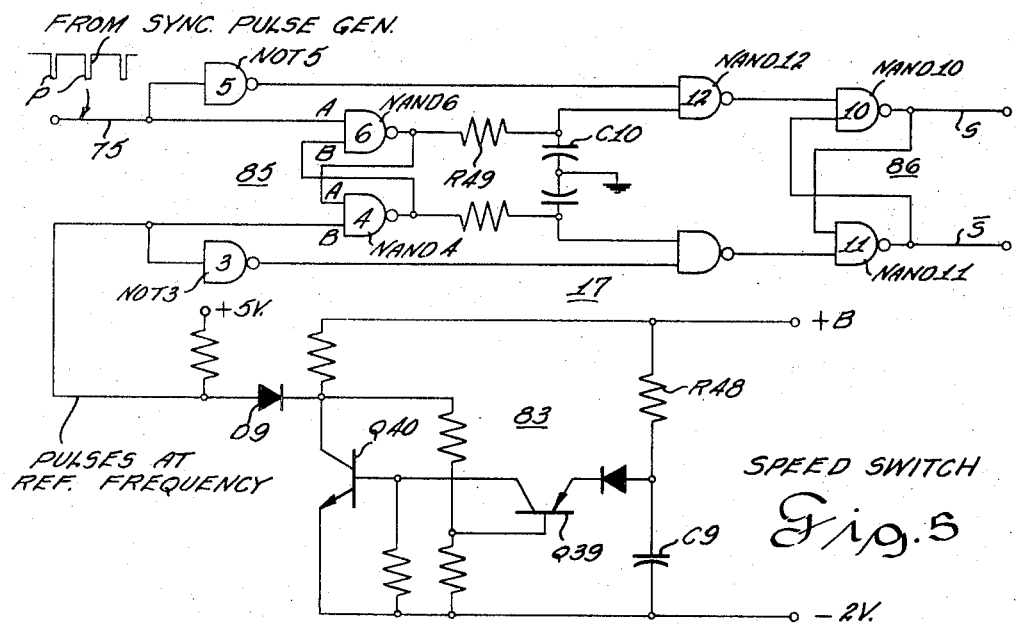
FIG. 5 is a schematic wiring diagram of the speed switch.

Speed switch 17 shown in FIG. 5 and disclosed in the aforemention copending application Ser. No. 266,286 of A. F. Geiersback et al, detects when motor speed is equal to the predetermined critical speed at which the torque angle is changed between 0° and 60°. The critical motor speed is set by a relaxation oscillator 83 which generates a train of pulses at a reference frequency. The input to speed switch 17 is the train of negative-going timing pulses P over conductor 75 from the synchronous pulse generator 14. Logic 1 on output lead S indicates that the timing pulses P are coming in faster from the synchronous pulse generator 14 than pulses from the reference oscillator 83 and that the motor rotor is above the critical speed.

In a similar manner the output of gate NAND11 on the $\overline{S}$ lead to speed-direction circuit 16 is set to logic 1 when the pulses from the reference oscillator 83 occur faster than the timing pulses P from the synchronous pulse generator 14.

DIRECTION SWITCH

FIG. 1 schematically illustrates that a plus five volt (logic 1) source is connected through resistors R50 and R51 respectively to the F and $\overline{F}$ leads and that direction switch DS has normally closed contacts 90 that clamp the F lead to ground when the switch is in the forward position and are opened to provide plus 5 volts (or logic 1) on the F lead when the switch DS is operated to the reverse position. Direction switch DS also has normally open contacts 91 which permit the F lead to be at logic 1 potential when the switch DS is in the forward position and are closed to clamp the F lead to ground (and logic 0) when the switch DS is operated to the reverse position.

SPEED-DIRECTION CIRCUIT

The speed-direction circuit 16 receives logic 1 on the S lead from speed switch 15 when the motor speed is above the critical speed and a 60° torque angle is desired. Speed-direction circuit 16 receives logic 1 on the F lead when the direction switch DS is operated to provide forward motor rotation and receives logic 1 on the $\overline{F}$ lead when direction switch DS is operated to reverse the direction of rotation of the motor.

The speed-direction circuit 16 (see FIG. 6) is disclosed in detail in the aforementioned copending application Ser. No. 266,286 of A. F. Geiersbach et al and provides information to the angle-direction circuit 19 concerning the desired direction and torque angle signals. The torque angle information is derived from speed switch 17 and the direction information is derived from direction switch DS, and speed-direction circuit 16 provides logic 1 on the $\overline{S}'F$ output lead when forward rotation below the critical speed is desired; it provides logic 1 on the $\overline{S}'\overline{F}$ lead when reverse rotation below the critical speed is desired; it provides logic 1 on the $S'F$ lead when forward rotation is desired and the motor speed is above the critical speed; and it provides logic 1 on the $S'\overline{F}$ lead when reverse rotation is desired and the motor speed is above the critical speed.

Speed-direction circuit 16 also provides for proper braking action should the direction switch DS be reversed. Speed direction circuit 16 includes a memory latch 93 having a pair of three-input NAND gates NAND 14 and NAND15 which lock the latch 93 in the condition existing when the signal on the S lead from the speed switch 15 goes from logic 0 to logic 1, i.e., when the motor exceeds the critical speed. Below the critical motor speed, logic 1 exists on the $\overline{S}$ lead and logic 0 exists on the S lead and the memory latch 93 will respond to the signals on the F and $\overline{F}$ leads from the direction switch DS to vary the logic signals on the $\overline{S}'F$, $\overline{S}'\overline{F}$, $S'F$ and $S'\overline{F}$ leads to angle-direction circuit 19 and thus change torque angle and motor direction. Thus, if the direction switch DS is reversed, the signals on leads F and $\overline{F}$ reverse to change the direction of motor rotation, and the state of memory latch 93 can change as long as the signal on lead $\overline{S}$ is 1 and the signal on lead S is logic 0. As the motor speed rises above the critical value, the signal on lead S becomes logic 1 and that on lead $\overline{S}$ becomes logic 0, locking the memory latch 93 and recording the status of direction switch DS at that time. As long as motor speed remains above the critical speed, a change in the direction switch DS will not change the state of the memory latch 93 and thus will not change the direction of mtor rotation.

The three-input NAND gates NAND14 and NAND15 compare the status of memory latch 93 with the status of direction lever DS when the motor is above the critical speed. If the memory latch 93 and direction switch DS both agree, either both forward or both reverse, then the 60° torque angle is allowed, as indicated by S' equals logic 1.

If, however, the latch 93 and direction lever $\overline{DS}$ disagree, as would occur if the vehicle were going forward above the critical speed and the operator changed the direction switch DS to call for reversal of the motor, then the torque angle is changed to 0° to provide braking action even though the speed switch 17 provides logic 1 on the S lead. This is necessary because at high speeds motor operation with a 120° torque angle can be similar to that at a 60° torque angle, and changing the direction switch DS from forward to reverse displaces the phase angle by 180°, thereby converting the 60° torque angle to 120°. Consequently, if the operator reversed the direction switch DS to reverse vehicle direction when the motor was above the critical speed, the vehicle would not respond with braking and subsequent reversing action if S' remained logic 1, but rather would continue to drive in the forward direction and might even go faster. The speed-direction circuit 16 corrects this by changing the torque angle from 60° to 0° when the direction switch DS is reversed and motor speed is above the critical speed.

Reversal of the direction switch DS under such high speed conditions provides logic 0 and the F lead and logic 1 on the $\overline{F}$ lead, the output of gate NAND16 remains logic 1 and the output of gate NAND17 remains logic 1 so memory latch 93 does not change states. The output of gate NAND14 remains logic 1 since it has logic 0 on its B input from gate NAND18, but the output of gate NAND15 becomes logic 1 when lead F becomes logic 0. The logic 1 output from both gates NAND14 and NAND15 provide logic 0 output from gate NAND24 on the S' lead and logic 1 on the output of gate NOT7 and the $\overline{S}'$ lead. The logic 1 on the $\overline{S}'$ and $\overline{F}$ leads provides logic 0 output from gate NAND21 which is converted to logic 1 on the $\overline{S}'\overline{F}$ lead to call 0° torque angle and for braking of the motor.

The logic 1 output of gate NAND15 when the motor is rotating forward above the critical speed and direction switch DS is reversed is thus a braking signal which provides logic 1 on the $\overline{S}'\overline{F}$ lead (or on the $\overline{S}'F$ lead of the motor is rotating in the reverse direction) and results in braking of the motor. In alternative embodiments different means such as a manually operated braking lever derive a braking signal, and the speed-direction circuit is responsive to such braking signal to change torque angle into a different quadrant to accomplish braking of the motor.

If the operator should change his mind and return direction switch DS to the forward position, the memory latch 93 would not change states, but the output of gate NAND14 would become logic 0, and the output of gate NAND24 on the S' lead would become logic 1, thereby providing logic 0 on the output of gate NAND22 and logic 1 on the S'F lead. This ability to change the torque angle above the critical speed can be utilized by the vehicle drive to obtain flexibility in operation of the vehicle.

In a similar manner the operator can change the torque angle from 60° to 0° to brake the vehicle when the motor is operating in the reverse direction above the critical speed by actuating the direction switch DS to the forward position.

ANGLE-DIRECTION CIRCUIT

Figure 6:
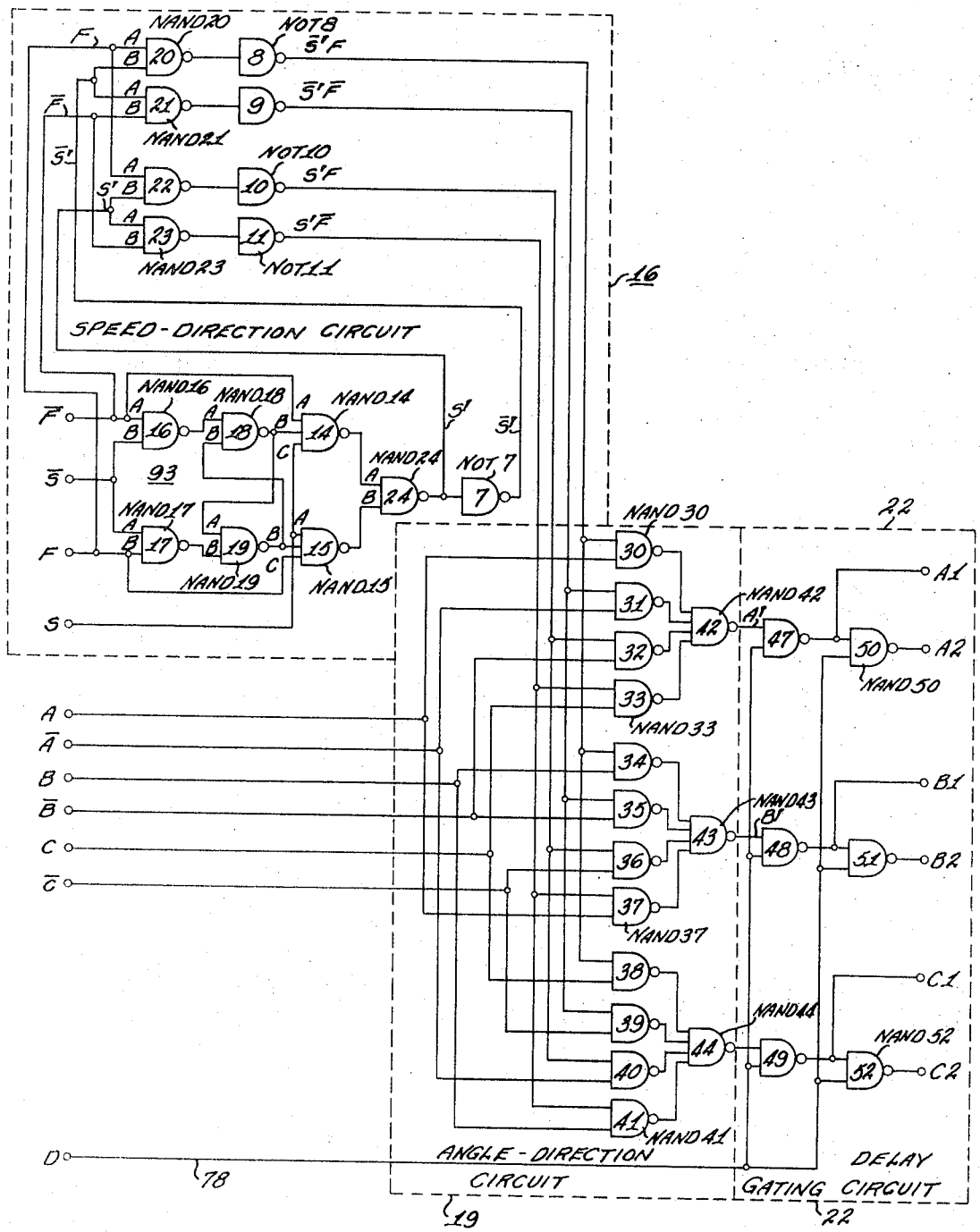
FIG. 6 is a schematic wiring diagram of the speed-direction circuit, the angle-direction gating circuit, and the delay gating circuit.

Angle-direction gating circuit 19 shown in FIG. 6 selects one of four different signal patterns for the output voltage phase displacement with respect to the rotor position in accordance with the information on the $\overline{S}'\overline{F}$, $\overline{S}'F$, $S'F$ and $S'\overline{F}$ leads from the speed-direction circuit 16. The rotor position signals A, $\overline{A}$, B, $\overline{B}$, C and $\overline{C}$ are utilized to determine the conduction windows for the power switches PSA1–PSC2 and thus control the phase angle of output voltage relative to rotor position, and one of four possible rotor position signals from the group A, $\overline{A}$, B, $\overline{B}$, C or $\overline{C}$ is coupled (after delay) to the interface circuits for the pair of power switches associated with each phase of the motor in accordance with the information on the $\overline{S}'F$, $\overline{S}'\overline{F}$, $S'F$, and $S'\overline{F}$ leads to provide: (a) 0° torque angle, forward rotation; (b) 0° torque angle, reverse rotation; (c) 60° torque angle, forward rotation; or (d) 60° torque angle, reverse rotation.

Angle-direction gating circuit 19 includes twelve NAND gates NAND30 through NAND41 each of which has an A input connected to one of the $\overline{S}'F$, $\overline{S}'\overline{F}$, $S'F$, or $S'\overline{F}$ leads from the speed-direction circuit 16 and a B input connected to one of the A, $\overline{A}$, B, $\overline{B}$, C or $\overline{C}$ leads from square wave generator 12. Four gates NAND 30–33 are associated with phase A of the motor and power switches PSA1 and PSA2; four gates NAND 34–37 are associated with phase B of the motor and power switches PSB1 and PSB2; and four gates NAND 38–41 are associated with phase C of the motor and power switches PSC1 and PSC2. The outputs of the four gates NAND 30–33 associated with phase A are inputs to a four-input NAND gate NAND42. The outputs of the four gates NAND 34–37 associated with phase B of the motor are inputs to a four-input NAND gate NAND43, and the outputs of the four gates NAND 38–41 associated with phase C of the motor are inputs to four-input NAND gate NAND44.

FORWARD ROTATION BELOW CRITICAL SPEED

The output of gate NAND42 designated A' is logic 1 whenever any one of the four gates NAND 30–33 is enabled, or opened so that its output is logic 0, and thus the A' output of gate NAND42 can be any one of the four rotor position signal inputs A, $\overline{A}$, $\overline{B}$, or C to the gates NAND30, NAND31, NAND32 or NAND33, respectively. The A' output of gate NAND42 is the rotor position signal A when logic 1 appears on the S'F lead calling for forward rotation of the motor at 0° torque angle, and the logic 1 output A' is converted by NAND gate 47 of delay gating circuit 22 to logic 0 input over lead A1 to interface circuit IFA1 and results (assuming no time delay) in conduction by power switch PSA1 for the duration of the A rotor position signal as represented by the current pulses CA1 from power switch PSA1 shown in FIG. 7a. The B' and C' outputs of gates NAND43 and NAND44 are the rotor position signals B and c respectively when logic 1 exists on the $\overline{S}'F$ lead, (forward rotation below critical speed) and under these conditions (assuming no time delay), the outputs of gates NAND48 and NAND49 of delay gating circuit 22 and logic 0 on the B1 and C1 leads to interface circuits IFB1 and IFC1, respectively, and power switches PSB1 and PSC1 will conduct for the duration of the rotor position sensor output waves B and C, respectively.

REVERSE ROTATION BELOW CRITICAL SPEED

The A' output of gate NAND42 is the rotor position signal $\bar{A}$ when logic 1 appears on the $\bar{S}'\bar{F}$ lead from speeddirection circuit 16 (calling for reverse direction of the motor below critical speed at 0° torque angle) and the A' = A output from gate NAND42 is converted by gates NAND47 and NAND50 of delay gating circuit 22 to logic 0 input over lead A1 to interface circuit IFA1 and logic 1 input over lead A2 to interface circuit IFA2 and results (assuming no time delay) in conduction by power switch PSA1 and turning off of power switch PSA2 and for the duration of the $\bar{A}$ rotor position signal as represented by current pulses CA1 from power switch PS1A shown in FIG. 7b. The B' and C' outputs of gates NAND43 and NAND44 will similarly be rotor position signals $\bar{B}$ and $\bar{C}$ when logic 1 exists on the $\bar{S}'\bar{F}'$ lead calling for reverse rotation at 0° torque angle, and the gates NAND48 and NAND49 of delay gating circuit 22 will convert these signals to logic 0 on leads B1 and C1, respectively, and the gates NAND51 and NAND52 will provide logic 1 on leads B2 and C2, respectively, so that power switches PSB1 and PSC1, respectively, are enabled to conduct and power switches PSB2 and PSC2, respectively, turn off (assuming no delay) for the duration of the rotor position signals $\bar{B}$ and $\bar{C}$. This results in the stator rotating magnetic field being shifted 180 electrical degrees relative to the rotor and causes rotor R to reverse its direction of rotation. Reversal of rotor direction causes rotor position sensor 11 to generate rotor position signals in the sequence A, $\bar{B}$, C, $\bar{A}$, B, $\bar{C}$ with time plotted to the left as shown in FIG. 3 so that the power switches are enabled in the sequence PSA2, PSB1, PSC2, PSA1, PSB2 and PSC1 during the duration of rotor position signals A, $\bar{B}$, C, $\bar{A}$, B, $\bar{C}$, respectively, when logic 1 appears on the $\bar{S}'\bar{F}$ lead.

FORWARD ROTATION ABOVE CRITICAL SPEED

The A' output of gate NAND42 is the rotor position sensor output wave $\bar{B}$ when logic 1 exists on the S'F lead from speed-direction circuit 16 (calling for forward rotation at 60° torque angle above the critical speed) and the output of gate NAND32 becomes logic 0 when $\bar{B}$ equals logic 1. The A' = $\bar{B}$ (logic 1) output from gate NAND42 is converted by gate NAND47 of delay gating circuit 22 to logic 0 input over lead A1 to interface circuit IFA1 and results (assuming no time delay) in conduction by the power switch PSA1 for the duration of the B position sensor output signal as represented by the current pulses CA1 from power switch PSA1 shown in FIG. 7c. It will be noted that rotor position signal $\bar{B}$ leads signal A by 60° so that conduction by power switch PSA1 is shifted 60° relative to the rotor R, and consequently the torque angle is 60° leading. The B' and C' outputs of gates NAND43 and NAND44, respectively, will similarly be the rotor position signals $\bar{C}$ and $\bar{A}$ when logic 1 exists on the S'F lead calling for forward rotation above the critical speed, and (assuming no delay) the switches PSB1 and PSC1 will conduct for the duration of the $\bar{C}$ and $\bar{A}$ rotor position signals. These signals are converted by gates NAND48 and NAND49 to logic 0 on the B1 and C1 leads and will also be converted by gates NAND51 and NAND52 to logic 0 on the B2 and C2 leads so that power switches PSB1 and PSC1 respectively, will conduct (and power switches PSB2 and PSC2 respectively, will be turned off) for the duration of the $\bar{C}$ and $\bar{A}$ rotor position signals. The power switches conduct in the sequence PSA2, PSB1, PSC2, PSA1, PSB2, PSC1 during (assuming no delay) the duration of the rotor position signals B, $\bar{C}$, A, $\bar{B}$, C, A, respectively, and accomplish 60° electrical leading phase shift of the conduction window for the power switches and forward rotation of the rotor R.

REVERSE ROTATION ABOVE CRITICAL SPEED

The A' output of gate NAND42 is the rotor position signal C when logic 1 on the S'$\bar{F}$ lead (calling for reverse direction at 60° leading torque angle above the critical speed) and provides logic 0 output from gate NAND33 during the duration of the C signal. The resulting A' = C (logic 1) output from gate NAND42 is converted by gate NAND47 to logic 0 on the A1 lead and by gate NAND50 to logic 1 on the A2 lead and results (assuming no delay) in enabling power switch PSA1 to conduct and turning off power switch PSA2 for the duration of the C rotor position signal as represented by current pulses CA1 from power switch PSA1 shown in FIG. 7d. It will be noted that for reverse rotation the rotor position signal C leads signal A by 60° electrical (to the left in FIG. 3) to thus accomplish 60° leading phase shift of the current conduction by power switch PSA1 relative to the rotor position. The B' and C' outputs of gates NAND43 and NAND44 will be the rotor position signals A and B, respectively, when logic 1 exists on the S'F lead. Gates NAND48 and NAND49 will convert the B' = A and C' = B signals to logic 1 inputs over leads B1 and C1 to interface circuit IFB1 and IFC1, respectively, and gates NAND51 and NAND52 will convert the B' = A and C' = B rotor position signals to logic 0 outputs on leads B2 and C2 to interface circuits IFB2 and IFC2. Consequently, power switches PSB1 and PSC1, respectively, will be turned off and PSB2 and PSC2, respectively, will conduct during the duration of the A and B rotor position signals. The power switches will be enabled to conduct in the sequence PSC1, PSA1, PSB1, PSC2, PSA1, and PSB2 during the rotor position signals B, $\bar{C}$, A, $\bar{B}$, C, $\bar{A}$ to accomplish 60° leading phase shift of the rotating magnetic field relative to rotor position and thus rotate rotor R in the reverse direction with 60° leading torque angle.

DELAY GATING CIRCUIT

Delay gating circuit 22 includes three NAND gates NAND47, NAND48 and NAND49 having a first input connected respectively to the A', B' and C' leads from the angle-direction circuit 19 and a second input connected to lead 78 from variable delay circuit 15 in which the delay pulses P' (see FIG. 3c) appear that are delayed as a function of the setting of power control potentiometer PCP. The outputs of gates NAND47, NAND48 and NAND49 are connected respectively to the A1, B1 and C1 leads to the interface circuits IFA1, IFB1 and IFC1 where they are amplified to trigger power switches PSA1, PSB1 and PSC1 into conduction. The outputs of gates NAND47, NAND48 and NAND49 are also coupled to first inputs of NAND gates NAND50, NAND51 and NAND52, respectively, each of which has a second input connected to lead 78 in which the train of delay pulses P' appears and which have their outputs respectively coupled to the A2, B2, and C2 leads to the interface circuits IFA2, IFB2 and IFC2 for gating power switches PSA2, PSB2 and PSC2, respectively.

Gates NAND 47–52 are not opened or enabled until the logic 1 voltage of delay pulses P′ (see FIG. 3c) is applied to their inputs, and consequently the rotor position square waves A, $\bar{A}$, B, $\bar{B}$, C and $\bar{C}$ which appear on the A′, B′ and C′ leads are not applied to the interface circuits to trigger power switches PSA1–PSC2 into conduction until the delay pulses P′ are applied to the inputs to NAND gates 47–52, thereby varying the conduction time by the power switches PSA1–PSC2 and consequently regulating motor torque and speed. The duration of the signals A1, A2, B1, B2, C1 and C2 from NAND gates 47–52 of delay gating circuit 22 is determined by the width of the P′ delay pulses from variable delay circuit 15, and the conduction time of the power switches PSA1–PSC2 is a function of the time interval that NAND gates 47–52 are open. Inasmuch as three delay pulses P′ occur during each half cycle (i.e., each 180 electrical degrees), each signal A1–C2 from gates NAND 47–52 can vary in width from 0° to 60°, and consequently power conduction by the power switches PSA1–PSC2 is regulated from zero conduction to full 180° power switch operation. NAND gates 47–49 generate the three wave segments per half cycle (such as CC2 shown in FIG. 3e) which control gating of power switches PSA1, PSB1 and PSC1, and NAND gates 50–52 generate the three complements of such wave segments which control gating of power switches PSA2, PSB2 and PSC2.

Assume that logic 1 exists on the $\bar{S}'F$ lead calling for forward rotation below the critical speed and that the power control potentiometer PCP is adjusted to accomplish 30° delay of the pulses P′ from variable delay circuit 15. The A′ output of gate NAND42 becomes logic 1 at the leading edge of the A wave, but the outputs of gates NAND47 and NAND50 remain logic 1 because of logic 0 on lead 78 so that interface circuit IFA1 does not trigger power switch PSA1 into conduction until 30° later when the logic 1 delay pulse P′ changes the output of gate NAND47 to logic 0 to turn on transistor Q11 of interface circuit IFA1 and thus trigger power switch PSA1 into conduction. The logic 0 output from gate NAND47 is coupled to one input of gage NAND50 and thus maintains its output at logic 1 which is applied to the A2 lead to interface circuit IFA2 so that power switch PSA2 does not conduct.

While only a single embodiment of the invention has been illustrated and described, it should be understood that we do not intend to be limited to the single embodiment for many modifications and variations thereof will be obvious to those skilled in the art.

The embodiments of the invention in which an exclusive property or privilege is claimed are defined as follows:

1. An electronic commutation system comprising, in combination,
   an electric motor having a ferromagnetic stator provided with n phase power windings displaced 360/n degrees apart, where n is an integer greater than one,
   a ferromagnetic rotor mounted for rotation within said stator,
   means for generating magnetic poles in said rotor,
   an electric power source,
   n transistor power switches each of which is in series with one of said power windings across said power source,
   means for deriving a plurality of time-displaced rotor position signals at a frequency which is a function of rotor angular velocity during rotation of said rotor through 360 electrical degrees each of which is indicative of a different position of said rotor within said stator,
   means for turning on each of said power switches during a different rotor position signal so that the magnetic field generated by said stator phase power windings rotates in synchronism with said rotor poles, and
   means including winding means on said stator inductively linked to stator phase power windings for supplying base drive to said transistor power switches when they are turned on by the rotor position signals.

2. In the combination of claim 1 wherein each transistor power switch has its emitter-collector circuit in series with one of said power windings, and said means for supplying base drive includes n drive windings on said stator each of which is mutually coupled with one of said stator phase power windings so that current is regeneratively fed back from the inductively related power and drive windings on the stator associated with said transistor power switches to sustain conduction thereby during said rotor position signals.

3. In the electronic commutation system of claim 2 wherein said means for supplying base drive forward biases said power transistor switches and includes a base drive transistor for each said power switch connected between said power switch and the associated drive winding, whereby base current is regeneratively fed back from the associated inductively linked phase power and drive windings through the associated base drive transistor to sustain conduction of the power switch for each phase.

4. In the electronic commutation system of claim 3 wherein said rotor position signal is coupled to the base of the associated base drive transistor and the base of each said power switch is connected through the emitter-collector circuit of the associated base drive transistor to the associated phase drive winding, and a diode is connected across the emitter and collector of each base drive transistor in opposite polarity thereto so that reverse bias is coupled to the base of the associated power switch when the polarity of the associated drive winding reverses upon turning off the power switch.

5. In the combination of claim 4 wherein each power switch includes a plurality of paralleled power transistors having their emitters commoned and their collectors commoned and their bases connected through similar resistors to the emitter of the associated base drive transistor.

6. In the combination of claim 2 wherein said power source is unidirectional and each said phase power winding has a center tap, and including 2n power transistor power switches each of which is in series with said source and one of the stator phase power winding halves which are joined at a center tap, said power switches being connected so that the magnetic fluxes generated by the halves of each stator phase power winding are in opposite directions and operate in push-pull.

7. In the combination of claim 6 wherein the center taps of all said phase power windings are commoned, each said drive winding has a center tap, and each of the drive winding halves which are joined at the center tap is inductively linked with a power winding half of the corresponding phase, said center taps of all of said drive windings being commoned.

8. In the combination of claim 4 wherein said base drive is regeneratively fed back through said inductively linked phase power and drive windings and the emitter-collector circuit of the associated base drive transistor and is of sufficient magnitude to forward bias the associated power transistor switch in saturation when said rotor position signal turns it on, and wherein degenerative current limit turn-off of said power transistor switch by transformer action through said inductively linked power and drive windings and said diode occurs if the collector current of said power transistor switch becomes sufficiently high to pull it out of saturation and into the active region.

9. In the combination of claim 8 wherein removal of said rotor position signal turns off the associated base drive transistor so that regenerative feedback can no longer support the associated power transistor switch in saturation and the consequent increase of its collector-to-emitter voltage and reversal of the polarity of said associated drive winding results in reverse bias being degeneratively fed back through said diode to the base of said power transistor switch to turn it off.

10. In the combination of claim 4 and including drive oscillator means for applying a succession of narrow forward bias pulses through the emitter-collector circuit of said base drive transistor to the base of the associated transistor power switch during said rotor position signal to defeat reverse bias to and re-initiate conduction thereby, each of said narrow pulses being of sufficient magnitude to operate the associated power transistor switch in saturation.

* * * * *

PO-1050
(5/69)

UNITED STATES PATENT OFFICE
CERTIFICATE OF CORRECTION

Patent No. 3,840,790          Dated October 8, 1974

Inventor(s) Frederick A. Stich and Glenn W. Schwantes

It is certified that error appears in the above-identified patent and that said Letters Patent are hereby corrected as shown below:

Column 20, line 13, --- said --- should be inserted between "to" and "stator."

Signed and sealed this 10th day of December 1974.

(SEAL)
Attest:

McCOY M. GIBSON JR.
Attesting Officer

C. MARSHALL DANN
Commissioner of Patents